United States Patent

[11] 3,571,495

[72] Inventor Marcel Johan Marie Konings
Emmasingel, Eindohoven, Netherlands
[21] Appl. No. 760,448
[22] Filed Sept. 18, 1968
[45] Patented Mar. 16, 1971
[73] Assignee U.S. Philips Corporation
New York, N.Y.
[32] Priority Sept. 30, 1967
[33] Netherlands
[31] 6,713,338

[54] LIGHT-INTENSITY CONTROL DEVICE FOR A TELEVISION CAMERA
9 Claims, 2 Drawing Figs.

[52] U.S. Cl. .......... 178/5.4, 178/7.2
[51] Int. Cl. .......... H04n 9/04, H04n 5/34
[50] Field of Search .......... 178/7.2, 7.2 (E), 5.4

[56] References Cited
UNITED STATES PATENTS
3,102,163 8/1963 Sennhenn .......... 178/7.2(E)
3,324,405 6/1967 Corney .......... 178/7.3(DC)

*Primary Examiner*—Richard Murray
*Attorney*—Frank R. Trifari

ABSTRACT: A light-intensity control system for a television camera, in which a capacitor circuit is charged by the video signal and discharged by a control current. The system has a first threshold circuit with narrow limits for controlling the aperture, in order to obtain accurate, but slow, control. The circuit also has a second threshold circuit with wider limits that effects a more rapid control and increases the control current discharging the capacitor.

Figure 1:
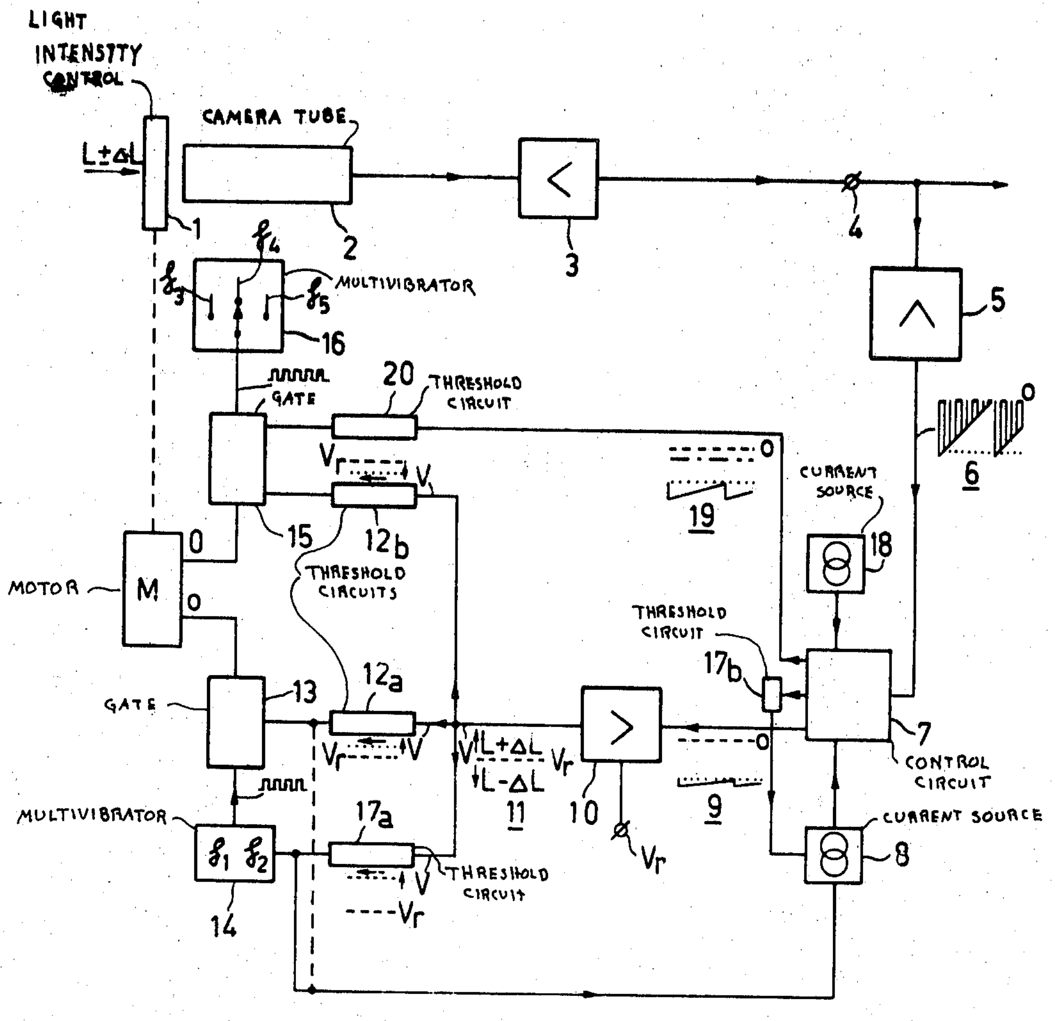

INVENTOR.
MARCEL J.M.KONINGS
BY
Frank R. Trifari
AGENT

INVENTOR.
MARCEL J. M. KONINGS
BY
Frank R. Trifari
AGENT

LIGHT-INTENSITY CONTROL DEVICE FOR A TELEVISION CAMERA

The invention relates to a light-intensity control device for a television camera provided with at least one camera tube upon which the light coming from a scene with variations of its maximum intensity is projected through a light-intensity control element controlled by a motor and keeping the varying maximum light intensity substantially constant at a level which is nominal for the camera tube, said motor being controllable to this end by a control signal given off by the light-intensity control device for which purpose a measuring signal derived from the picture signal provided by the camera is applied to a capacitor and associated current source in the device through an element conducting current in one direction, the control signal being given off by the light-intensity control device if the difference between the voltage across the capacitor and a reference value corresponding to the nominal light-intensity for the camera tube exceeds a threshold value.

Such light-intensity control devices are normally used for converting the light coming from a scene with varying maximum light intensity into a picture signal given off by a monochrome or color television camera and laid down between a minimum and a maximum value. The picture signal displays the gradations in the scene in the correct manner between these values, the so-called black level and the white level which corresponds to the nominal light intensity for the camera tube. For obtaining sufficient, correct gradations the maximum value of the varying light intensity of the scene must be brought to the nominal value of the light intensity for the camera tube or tubes with the aid of the light-intensity control element. Both a quick adaptation of the light-intensity control element to the varying maximum light intensity of the scene and keeping the light-intensity constant between narrow limits around the nominal value for the camera a tube are then required. This control is important especially in those cases where scenes are picked up of which the white level in the picture signal is much liable to variations such as, for example, when picking up scenes outside the studio and when converting film images into video signals.

From the above follow certain requirements which must be set to the light-intensity control device. The requirements set particularly relate to the variation in the voltage across the capacitor as a function of which the control signal is given off by the light-intensity control device. The voltage across the capacitor is dependent on the one hand on the maximum value of the measuring signal derived from the picture signal and on the other hand on the current supplied by the current source. Apart from the polarity of its load the capacitor is quickly charged to the maximum value of the measuring signal and simultaneously discharged by the current source with a greater time constant. In this manner the voltage across the capacitor has a ripple voltage about the reference value which corresponds to the nominal light intensity for the camera tube. If said ripple voltage exceeds a threshold value, a control signal for the light-intensity control is given off by the device. An accurate control thus requires a low threshold value relative to nominal level, that is to say, a comparatively low ripple voltage across the capacitor. From this it follows that the current supplied by the current source may give only a small voltage variation or ripple voltage across the capacitor. On the other hand a quick control requires a high ripple voltage across the capacitor so as to be able to follow quick variations in the maximum value of the measuring signal.

In practice the two opposed requirements concerning the ripple voltage across the capacitor give rise to a compromise, detracting either from accuracy or from control speed.

An object of the invention is to provide a solution without compromise ensuring both accuracy and speed of the control. To this end the light-intensity control device according to the invention is characterized in that in order to obtain a light-intensity control element which operates accurately and quickly a threshold circuit in the light-intensity control device is made operative when the said first threshold value and a second, higher threshold value respectively is exceeded due to the difference between the voltage across the capacitor and the reference value which corresponds to the nominal light intensity for the camera tube, said threshold circuit applying a signal to the said current source so that the current supplied to the capacitor is increased.

When the maximum light intensity decreases relative to the nominal level it is desirable to quickly obtain a clear, unambiguous indication of the decrease while the capacitor voltage changes slowly. For a simple solution of this problem regarding a spread or tolerance zone for the threshold value the device according to the invention is furthermore characterized in that when said first threshold value is exceeded for a maximum light intensity which is smaller than the nominal light intensity for the camera tube, the signal applied through a threshold circuit to said current source is provided by a second capacitor and associated current source arranged in the light-intensity control device, the said measuring signal being also applied to the second capacitor through an element conducting current in one direction, while the quotient of capacitance and current supplied by a relevant current source about nominal light intensity for the camera tube is smaller for the first capacitor than for the second.

Undue maximum light intensity relative to the nominal light intensity for a camera tube always gives rise to disturbing side effects such as, for example, insufficient stabilization of the target plate provided in the tube and scanned by the electron beam and overdrive of the amplifiers, which causes a distorted presentation of the scene when displayed through a display tube on the screen thereof. This distortion becomes apparent in a very disturbing manner particularly in color television due to the colorful character. These errors can be eliminated in a very simple and quick manner without additional elements with the aid of the light-intensity control device according to the invention by varying the control speed dependent on the extent of increase of the light intensity and to this end the device is characterized in that the signal applied to said current source through a threshold circuit is also applied to a circuit determining the control signal when said second, higher threshold value is exceeded for a maximum light intensity which is higher than the nominal light intensity for the camera tube, the resultant control signal provided by the light-intensity control device increasing the control speed of said motor.

If for some reason or other the measuring signal falls away or if it is desirable to reduce the light-intensity of the scene to substantially zero for some time in case of, for example, changes of scenes, then it is undesirable that the light-intensity control device controls the light-intensity control element to a position of maximum transmission of light. In fact, for a following scene of maximum light intensity which is equal to the nominal light intensity, the light-intensity control element must then be controlled entirely back again. To prevent this unnecessary control a light-intensity control device according to the invention is furthermore characterized in that for a measuring signal having a very small value which corresponds to a minimum light intensity for the camera tube the resultant voltage across the second capacitor cuts off the supply of a control signal through an associated threshold circuit under influence of the associated current source.

Figure 2:
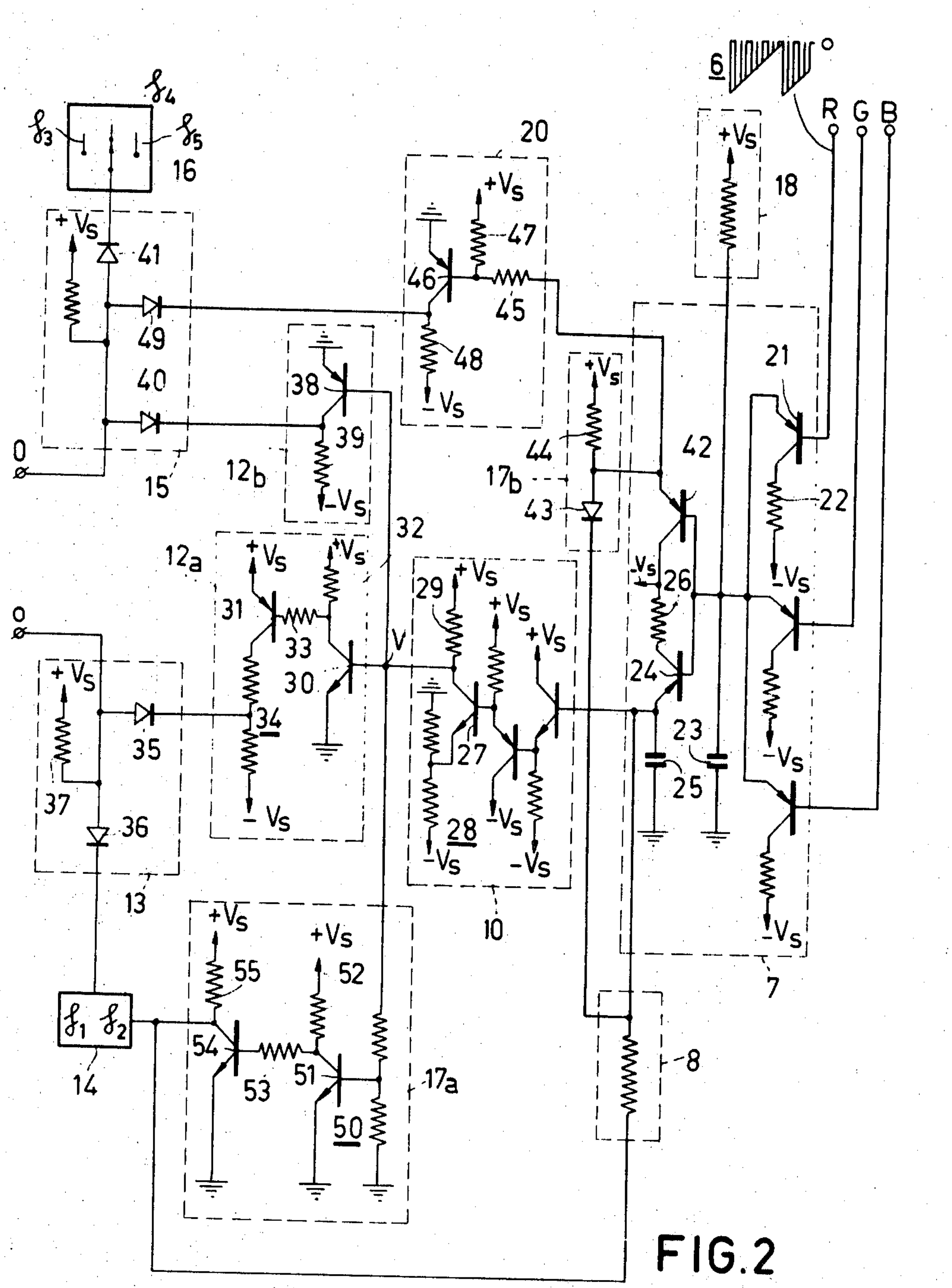

In order that the invention may be readily carried into effect, it will now be described in detail, by way of example, with reference to the accompanying diagrammatic drawings, in which:

FIG. 1 serves to clarify in a block diagram the structure of the light-intensity control device according to the invention; and FIG. 2 serves to describe in detail one embodiment of a device according to the invention.

In FIG. 1, $L\pm\Delta L$ shows the light coming from a scene with varying maximum light intensity which is projected on a television camera tube 2 through a light-intensity control element 1. Light-intensity control element 1 serves to eliminate the variations $\Delta L$ in the maximum light intensity $L\pm\Delta L$ of the light of the scene relative to a nominal level L which is advantageous for camera tube 2. The extent of transmission of light by control element 1 constructed as a diaphragm or as a light absorptive element is dependent on the position and the number of revolutions of the shaft of a motor M. Camera tube 2 supplies a picture signal through an amplifier 3 which signal is applied for further handling to an output terminal 4. The components shown in a simple manner may form part of a television camera, a further description of which is irrelevant for clarifying the principle of the invention.

The picture signal occurring at terminal 4 is applied to an amplifier 5. Amplifier 5 amplifies the picture signal, for example, as an AC voltage amplifier, and comprises a clamping circuit (not shown) which fixes the black level in the picture signal under influence of pulses occurring during the line blanking time. A measuring signal 6 thus obtained is shown for one and a half frame periods in FIG. 1. The black level in measuring signal 6 is indicated by the figure zero, while the white level is signal 6 corresponding to the nominal light intensity L for camera tube 2 is shown as a broken line. Measuring signal 6 thus indicates, as a voltage of negative polarity, that the picture signal occurring at terminal 4 represents a scene varying from white through grey to black in a continuous manner. The white of the scene, that is to say, the maximum light intensity of the scene then approximately corresponds to the nominal light intensity $L$ for camera tube 2. An increase or decrease of the maximum light intensity of the scene relative to the nominal light intensity $L$ for the tube 2 will result in the amplitude of measuring signal 6 being larger or smaller than is shown in FIG. 1 for the same position of the light-intensity control element.

Measuring signal 6 is applied to a circuit 7 provided within the light-intensity control device for determining the amplitude of signal 6. To this end signal 6 is applied to a capacitor through an element conducting current in one direction in a known manner not shown in circuit 7. A current source associated with said capacitor in circuit 7 is indicated by 8 and the result of negative charging of the capacitor under influence of signal 6 on the one hand and discharging under influence of source 8 on the other hand is indicated by signal 9. Signal 9 represents a DC voltage of negative polarity on which a ripple voltage is superimposed. Said DC voltage corresponds to the white level shown in measuring signal 6 by a broken line. For obtaining this relation the amplitude in measuring signal 6 must exceed the white level to a slight extent as is shown at signal 6.

Signal 9 is applied to an amplifier 10 where a reference voltage $V_r$ is shown diagrammatically. If under influence of signal 6 voltage 9 has an instantaneous value which corresponds to the white level in signal 6, that is to say, the nominal light intensity $L$ for camera tube 2, amplifier 10 supplies a voltage $V$ which is equal to the reference voltage $V_r$. At reference numeral 11 is shown that amplifier 10 supplies a voltage $V$ which lies above or below the reference voltage $V_r$ for an increased light intensity $L+\Delta L$ or a decreased light intensity $L-\Delta l$. The voltage $V$ supplied by amplifier 10, is inter alia, supplied to two threshold circuits $12_a$ and $12_b$.

In threshold circuit 12a is shown diagrammatically that threshold circuit $12_a$ supplies a certain voltage to a gating circuit 13 for a value of voltage $V$ above a threshold value indicated by a broken line relative to the reference value $V_r$. Said voltage opens gating circuit 13 so that the signal generated by a multivibrator 14 is applied to motor M as a control signal. As a result motor M, which is, for example, designed as a stepping or synchronous motor, will start to run in a direction such that the light transmission by light-intensity control element 1 decreases. The time during which the position of control element 1 is changed is equal to that in which the voltage supplied by amplifier 10 exceeds the threshold value. The ultimate result is that the voltage $V$ supplied by amplifier 10 is controlled back to below the threshold value indicated at threshold circuit $12_a$ under influence of the amplitude of measuring signal 6 reduced by the control.

At the threshold circuit $12_b$ there is shown in a similar manner as at threshold circuit $12_a$ that threshold circuit $12_b$ opens a gating circuit 15 for a time during which a value of voltage $V$ comes below a threshold value relative to reference value $V_r$ shown by a broken line so that a signal generated by a multivibrator 16 is applied to motor M as a control signal. Multivibrator 16 has a selector switch so that, dependent on its position, a control signal at a frequency $f_3, f_4$ or $f_5$ is applied to the motor M designed as a stepping or synchronous motor. It is therefore possible for the transmission of light by the light-intensity control element 1 to increase arbitrarily at three speeds until the voltage $V$ supplied by amplifier 10 remains again within the threshold zone at reference voltage $V_r$.

For the light-intensity control device described so far the following applies relative to speed and accuracy of the control of the maximum light intensity.

If the scene projected on camera tube 2 locally has too great a light intensity relative to the nominal light intensity $L$, this will become apparent in the measuring signal 6 derived from the picture signal as a pulse exceeding the white level. Since the capacitor charged by the measuring signal 6 in circuit 7 has a certain time constant, the pulse must have a certain width, that is to say, the locally greater light intensity must have a certain extensiveness in order to be able to charge the capacitor. Due to the choice of a time constant which is, for example, adjustable and not too small, it is achieved that zones of great light intensity ranging from very small to small hardly influence the control. Particularly when converting film images into television images this effect is found to be advantageous since on the one hand the film material often has small damages of the film layer and thus comparatively great light intensities which are locally narrowly limited may occur when exposing the film, while on the other hand for a better display of the picture it is sometimes desirable that the light control reacts less strongly to smaller brighter details in the film image such as, for example, with small glowlights in strongly reflecting objects in the scene.

If the locally great light intensity has a certain extensiveness the light-intensity control device applies a control signal to the motor M so that the transmission of light by the light-intensity control element 1 decreases. In case of interlacing, the potential image on the target plate in the camera tube 2 corresponding to the scene is in principle entirely converted into picture signals only after two frame periods. This means that the change of the position of the light-intensity control element 1 likewise becomes apparent in a clear manner in the measuring signal 6 only after two frames periods. The electron beam in camera tube 2 has, however, such a large diameter that also in case of interlacing the lines scanned by the electron beam partially overlap. The result is that the influence of the changing light-intensity control element 1 becomes apparent in the picture signal and the measuring signal 6 derived therefrom already after approximately one frame period. For quick control it must be possible for signal 9, which indicates the voltage across the capacitor in circuit 7, to follow also the variation of the measuring signal 6 after approximately one frame period. Since the amplitude of the measuring signal 6 determines the load on the capacitor in circuit 7, and current source 8 determines the discharge, it appears that the discharge in signal 9 indicates to what extent the varying amplitude of the measuring signal 6 over a frame period can be followed. The conclusion is that a high ripple voltage in signal 9 is required for quick control.

A more or less accurate control is obtained by rendering the threshold values indicated at threshold circuits $12_a$ and $12_b$ lower or higher relative to the reference value $V_r$. If a variation in signal 9 amplified by amplifier 10 lies within these lower or higher threshold values the light-intensity control device will apply no control signal to motor M. Since the device must not provide a control signal for the measuring signal 6 shown in FIG. 1, it follows that the va iation or ripple voltage in signal 9 amplified through amplifier 10 must lie within these threshold values. The conclusion is that a low ripple voltage in signal 9 is required for accurate control.

It follows from the foregoing that the light-intensity control device described so far only gives rise to a compromise with respect to speed and accuracy.

According to the recognition of the invention a satisfactory solution is obtained by increasing the current supplied through current source 8 to the capacitor in circuit 7 when the threshold values laid down by the threshold circuits $12_a$ and $12_b$ are exceeded. In the block diagram of FIG. 1 this can simply be obtained for threshold circuit $12_a$ by connecting said circuit along the broken line to current source 8. As will be apparent hereinafter, for a more refined solution for obtaining quick and accurate control one embodiment of a light-intensity control device according to the invention is provided with a threshold circuit $17_a$ and a threshold circuit $17_b$ which are connected to current source 8. The voltage $V$ given off by amplifier 10 is supplied to threshold circuit 17*a* which, as is shown diagrammatically in FIG. 1, has a higher threshold value relative to the reference level $V_r$ as compared with threshold circuit $12_a$. If the voltage $V$ given off by amplifier 10 exceeds this higher, second threshold value a signal increasing the current supplied is fed to current source 8 with the aid of the threshold circuit $17_a$. A similar control is effected through threshold circuit $17_b$ which to this end is connected to circuit 7. The signal increasing the current for the capacitor in circuit 7 is then given off when the ripple voltage in signal 9 exceeds the level shown in situ by a broken line. Compared with the threshold value indicated at threshold circuit $12_b$ relative to the reference level $V_r$ the level shown in signal 9 by a broken line more or less corresponds thereto.

The light-intensity control device according to the invention has an accurate control, since the first threshold value determined by threshold circuits $12_a$ and $12_b$ has been chosen to be low relative to the reference level $V_r$. In conformity, therewith signal 9 has a low ripple voltage because the current supplied by current source 8 is low.

If the voltage $V$ provided by amplifier 10 under influence of signal 9 exceeds the first threshold value given by threshold circuit $12_a$, the control operates slowly. If in case of an increased maximum light intensity the second, higher threshold value of threshold circuit $17_a$ is also exceeded, the current supplied by current source 8 is increased. The capacitor included in circuit 7 is therefore discharged in an accelerated manner so that the capacitor voltage indicated by signal 9 can follow the varied measuring signal 6 more quickly. In this manner a quick control is possible outside the second threshold value relative to the reference level $V_r$.

When great maximum light intensities occur above the nominal light intensity of the camera tube 2 it is desirable to quickly eliminate these great variations for the camera tube 2. In the embodiment of a light-intensity control device according to the invention, shown in a block diagram in FIG. 2, threshold circuit $17_a$ is to this end not only connected to current source 8, but also to multivibrator 14. Threshold circuit $17_a$ supplies a high or a low DC voltage, dependent on whether the second, higher threshold voltage is exceeded or not exceeded by the voltage $V$ provided by amplifier 10. The low or high DC voltage determines the low or high value of current source 8 and a control signal having a low frequency $f_1$ or a high frequency $f_2$ is obtained by supplying the DC voltage as control voltage to multivibrator 14.

For quickly obtaining a clear, unambiguous indication that threshold circuit $17_b$ must apply the signal increasing the current for the said capacitor in circuit 7, a second capacitor (likewise now shown) is included in the circuit 7. This second capacitor, similarly as the first capacitor previously described, has the measuring signal 6 applied to it through an element conducting current in one direction. A current source 18 associated with the second capacitor provides, together with the measuring signal 6, a voltage across the second capacitor which is indicated by a signal 19. When comparing the signals 9 and 19 it is found that the ripple voltage at signal 19 is a few times higher than at signal 9. The magnitude of the ripple voltage is $1/C\int idt$, where C is the value of the relevant capacitor, $i$ is the substantially constant current supplied by current source 8 or 18 and where $dt$ must be integrated for the measuring signal 6 shown over one frame period. It follows that the magnitude of a ripple voltage for capacitors discharged in the same period is proportional to the quotient of a current supplied by a relevant current source and capacitance. Said ratio is larger for the second capacitor than for the first capacitor in circuit 7, as appears when comparing signals 19 and 9.

The first threshold value indicated in signal 9 by a broken line is likewise shown in signal 19 by a broken line for a corresponding value. If the ripple voltage in signals 9 and 19 exceeds the first threshold value, then signal 19 provides a more accurate indication regarding exceeding due to the higher ripple voltage and hence comparatively smaller spread zone about the threshold value.

The second capacitor in circuit 7 supplying the signal 19 has also a second function. It often occurs that two scenes must be interrupted by a short period in which no light comes from the scene. A clear example thereof is the projection of lantern slides. During changing of the slides the measuring signal 6 will fall to black level and signal 9 will cause the light-intensity control device to apply a control signal to motor M through gating circuit 15 and with multivibrator 16 when the threshold value in threshold circuit $12_b$ is exceeded. In this manner the light-intensity control element 1 will be controlled to maximum transmission of light. If, however, the subsequent scene has a maximum light intensity which is substantially equal to that of the previous scene, motor M must control the light-intensity control element substantially entirely back again. To avoid said unnecessary control the light-intensity control device is provided with an associated threshold circuit 20. The signal 19 showing the high ripple voltage is applied to threshold circuit 20 which supplies a voltage to gating circuit 15 for blocking thereof under influence of the exceeding, in signal 19, of a level shown by a dot and dash line which corresponds to a minimum light intensity for the camera tube 2. If the light intensity falls below the said minimum level, in the first instance the light-intensity control device will give off a control signal to motor M after the first threshold value is exceeded, which control signal is subsequently blocked. Instead of a great change of light-intensity control element 1 the result is only a small one.

FIG. 2 shows in detail one embodiment of a light-intensity control device according to the invention. Components having a reference numeral and already described in FIG. 1 have the same reference numerals in FIG. 2. The light-intensity control device of FIG. 2 is applicable both to color television, in which a plurality of control signals is simultaneously applied, and for monochrome television.

The light-intensity control device is provided with three input terminals R, G and B to each of which a measuring signal 6 is applied. Since part of the circuit 7 for handling the various measuring signals 6, is identical circuit 7 is further described starting from input terminal R. Indicated at input terminal R is that the measuring signal 6 is applied to the base of a transistor 21. The collector of transistor 21 is connected through a resistor 22 to a terminal conveying a negative voltage $-V_s$ of a DC voltage source $V_s$, of which the terminals conveying the positive voltage $+V_s$ will also further be described. The magnitude of resistor 22 determines in how far the circuit reacts to very small or greater details. The emitter of transistor 21 is connected to a terminal of a capacitor 23, the other terminal of which is connected to earth. The measuring signal 6 charges capacitor 23 in a negative sense to a voltage which is determined by the greatest amplitude, in a frame period, of one of the measuring signals 6 at input terminals R, G or B. Capacitor 23 is discharged by current source 18 which is designed as a resistor connected to a terminal carrying the positive voltage $+V_s$. The terminal of capacitor 23 carrying voltage is connected to the base of a transistor 24 the emitter of which is connected to a terminal of a capacitor 25 the other terminal of which is connected to earth. The collector of transistor 24 is connected through a resistor 26 to a terminal conveying the negative voltage $-V_s$. Capacitor 25 is on the one hand charged in a negative sense by a measuring signal 6 through transistor 24 but on the other hand it is discharged by current source 8 designed with a resistor. In the foregoing capacitors 25 and 23 are indicated as the first and the second capacitor, respectively. Consequently there applies that the quotient of current supplied by current source 8 about the nominal light intensity for the camera tube 2 and the value of capacitor 25 is smaller than the quotient of current supplied by current source 18 and the value of capacitor 23. Capacitors 25 and 23, respectively therefore convey a voltage as is shown by signals 9 and 19, respectively, in FIG. 1.

The terminal of capacitor 25 conveying voltage is connected to the amplifier 10 in which the voltage is supplied to the base of a transistor 27 through two transistors connected as emitter followers, which will not be further described. The emitter of transistor 27 is connected to a negative voltage, the value of which is determined by a potentiometer 28 which is connected between earth and a terminal conveying the negative voltage $-V_s$. The collector of transistor 27 is connected through a resistor 29 to a terminal conveying the positive voltage $+V_s$. Potentiometer 28 is adjusted in such manner that for the value of the voltage across capacitor 25 which corresponds to the white level in control signal 6, the collector of transistor 27 has the earth potential. Therefore the reference value $V_r$ given in FIG. 1 corresponds to the earth potential in the device of FIG. 2. Amplifier 10 will supply a positive or negative voltage for a maximum light intensity which is greater or smaller than the nominal value. If amplifier 10 supplies a small positive or negative voltage the threshold circuit $12_a$ or $12_b$ will be made operative.

Threshold circuit $12_a$ is provided with two transistors 30 and 31. The voltage V given off by amplifier 10 is supplied to the base of the NPN transistor 30, the emitter of which is connected to earth. If voltage V becomes more positive than the value which is determined by the base-emitter threshold voltage of transistor 30, then transistor 30 becomes conducting. The voltage across the collector which is connected through a resistor 32 to a terminal conveying the positive voltage $+V_s$ and through a resistor 33 to the base of transistor 31 will therefore decrease. The result is that PNP transistor 31 the emitter of which is connected to a terminal conveying the positive voltage $+V_s$ also starts to conduct. The collector of transistor 31 is connected through a potentiometer 34 to a terminal conveying the negative voltage $-V_s$. A tapping of potentiometer 34 is connected to gating circuit 13. When transistor 31 is not conducting the tapping of potentiometer 34 supplies the negative voltage $-V_s$ to the gating circuit 14. When transistor 31 starts conducting the negative voltage at the tapping of potentiometer 34 varies in the positive direction. The potentiometer 34 may, for example, be adjusted in such manner that the earth potential is connected to gating circuit 13 through the tapping. Threshold circuit $12_a$ is constructed in this manner as an amplifier having a built-in threshold level which amplifier can be manufactured at very low cost.

Gating circuit 13 includes two diodes 35 and 36. The cathodes of diodes 35 and 36, respectively, are connected to the tapping of potentiometer 34 and to the output terminal of multivibrator 14 conveying the control signal, respectively. The interconnected anodes of diodes 35 and 36 are on the one hand connected through a resistor 37 to a terminal conveying the positive voltage $+V_s$ and on the other hand they form an output terminal $o$ of the device. Resistor 37 has a high value and serves to obtain an initial current through the diodes 35 and 36. Multivibrator 14 supplies a pulsatory control signal, the values of which vary between earth potential and a voltage which is less negative than the most negative value which is given off by the threshold circuit $12_a$. For the general case it is found that the voltage values between which the pulsatory voltage is generated by multivibrator 14 must be located between the values of the DC voltages which are given off by threshold circuit $12_a$. For illustration it may be assumed that, for example, voltage $-V_s$ is $-12$ volts and the pulsatory control voltage varies between 0 and $-5$ volts. Since the output terminal $o$ of the device follows the most negative voltage through diodes 35 and 36 it is found that this is equal to the negative DC voltage of $-12$ volts or varies in a pulsatory manner between 0 and $-5$ volts. If motor M is constructed as a stepping or synchronous motor, this will start to rotate dependent on the frequency of the control signal and the duration of the supply thereof, and give the light-intensity control element 1 a position having a smaller transmission of light.

Threshold circuit $12_b$ is provided with a PNP transistor 38 the emitter of which is connected to earth. The voltage V of amplifier 10 is supplied to the base of transistor 38, while the collector is connected through a resistor 39, to a terminal conveying the negative voltage $-V_s$. If voltage V becomes more negative than the value which is determined by the base-emitter threshold voltage of transistor 38, then transistor 38 becomes conducting. The voltage across the collector of transistor 38 therefore varies from $-V_s$ to substantially earth potential. These voltages are supplied to the cathode of a diode 40 in gating circuit 15. The anode of diode 40 is inter alia connected to that of a diode 41, the output terminal of a multivibrator 16 being connected to its cathode. In an analogous manner as described for gating circuit 14, a control signal is given off through gating circuit 15 at output terminal 0 of the device, so that with the aid of motor M the transmission of light of light-intensity control element 1 increases. The supply of the control signals to output terminals 0 and $o$ of the device may of course take place through transistors in an emitter follower arrangement.

For obtaining a signal from circuit 7 for threshold circuits $17_b$ and 20, the circuits are connected to the emitter of a transistor 42, the base of which is connected to the terminal of capacitor 23 conveying voltage and the collector of which is connected to a terminal conveying the negative voltage $-V_s$.

In threshold circuit $17_b$ the emitter of transistor 42 in circuit 7 is connected to the anode of a diode 43 and through a resistor 44 to a terminal conveying the positive voltage $-V_s$. The cathode of diode 43 is connected to the junction of current source 8 constructed with a resistor and the terminal conveying the voltage of capacitor 25. The signals 19 and 9, respectively, shown in FIG. 1 correspond to the voltage across capacitors 23 and 25, respectively, which also occur at the anode and cathode, respectively, of diode 43 in threshold circuit $17_b$. Diode 43 has such a high ripple voltage that for the ripple voltage in the balanced state maximally occurring in signals 19 and 9 of FIG. 1, diode 43 just does not conduct. If the ripple voltage in signal 19 and attended therewith in signal 9 exceeds the level indicated by a broken line in the signals 19 and 9, the voltage between capacitors 23 and 25 exceeds the threshold voltage of diode 43 and diode 43 becomes conducting. An additional current is supplied to capacitor 25 for discharge through resistor 44 and diode 43 in threshold circuit $17_b$ in addition to the current normally supplied by current source 8. In this manner it is achieved that capacitor 25 is discharged more quickly with the aid of threshold circuit $17_b$, the voltages across capacitors 25 and 23 having a difference of the threshold voltage given by diode 43.

The capacitors 23 and 25 may be discharged even more quickly by also increasing the current supplied by current source 18 through threshold circuits in a similar manner as for capacitor 25.

In threshold circuit 20 the emitter of transistor 42 in circuit 7 is connected through a resistor 45 to the base of a PNP transistor 46 which is also connected through a resistor 47 to a terminal conveying the positive voltage $+V_s$. The emitter of transistor 46 is connected to earth, while the collector is connected on the one hand through a resistor 48 to a terminal conveying the negative voltage $-V_s$ and on the other hand to the cathode of a diode 49 included in gating circuit 15. The anode of diode 49 is connected to the anodes of diodes 40 and 41.

For the ripple voltage shown in signal 19 of FIG. 1 the voltage supplied to the base of transistor 46 is sufficiently negative to keep transistor 46 in a conducting state. As a result the earth potential is impressed on the cathode of diode 49. If for some reason or other the measuring signal 6 falls back to black level, then the threshold circuit $12_b$ will supply the earth potential instead of the voltage $-V_s$ to the cathode of diode 40 when the voltage B of amplifier 10 exceeds the threshold value of said threshold circuit. The result is that the gating circuit 15 opens and multivibrator 16 gives off the control signal for motor M to output terminal O. If subsequently the voltage across capacitor 23 exceeds the level indicated by a dot and dash line in signal 19, then the voltage supplied to threshold circuit 20 becomes so little negative that transistor 46 is cut off. The result is that the cathode of diode 49 in gating circuit 15 is brought to the voltage $-V_s$ so that the gating circuit 15 for multivibrator 16 is closed. It is found that the control signal is subsequently blocked after a short-lasting supply of the control signal to output terminal O.

In threshold circuit $17_a$ the voltage supplied by amplifier 10 is supplied to one side of a potentiometer 50 the other side of which is connected to earth. A tapping of potentiometer 50 is connected to the base of an NPN transistor 51 the emitter of which is connected to earth. The collector of transistor 51 is connected through a resistor 52 to a terminal conveying the positive voltage $+V_s$ and through a resistor 53 to the base of an NPN transistor 54. The emitter of transistor 54 is connected to earth while the collector is connected through a resistor 55 to a terminal conveying the positive voltage $+V_s$. The collector of transistor 54 is further connected to the multivibrator 14, and to the side of current source 8 constructed as a resistor remote from the capacitor 25.

If amplifier 10 supplies a voltage V which after voltage division across potentiometer 50 is smaller than the base-emitter threshold voltage of transistor 51 then said transistor does not conduct. On the contrary transistor 54 will conduct under influence of resistors 52 and 53 and the collector will substantially assume earth potential. Said earth potential serves as a control voltage for multivibrator 14 and a pulsatory signal having a frequency of $f_1$ is generated. The earth potential also supplied to current source 8 causes current source 8 to supply a certain current to capacitor 25. If the base-emitter threshold voltage of transistor 51, that is to say, the said second, higher threshold value is exceeded, transistor 51 comes in the conducting state and transistor 54 is cut off. As a result the positive voltage $+V_s$ is impressed on the collector of transistor 54 which voltage is supplied to multivibrator 14 and current source 8. The increase of the control voltage for multivibrator 14 has the known result that the frequency of the pulsatory signal increases to the value $f_2$. The increase of the voltage from earth potential to voltage $+V_s$ supplied to current source 8 results in a greater discharge current for capacitor 25.

It will be evident that other embodiments such as, for example, bistable trigger circuits or difference amplifiers for the threshold circuits are possible. The threshold circuits may alternatively be provided with a plurality of levels or may supply an output signal proportional to the input signal so that a proportional control is obtained. Other embodiments of the current source 8 and 18 may alternatively be used.

It will also be evident that many combinations of polarities of supply voltages and conductivity types of transistors may occur in a device according to the invention.

We claim:

1. A control circuit for a television camera comprising means for generating a measuring signal having an amplitude related to the maximum value of the camera output signal within each frame, a first capacitor coupled to receive said measuring signal, a current source means for discharging said capacitor from said maximum value, a first threshold circuit means coupled to said capacitor for generating a first control signal when the capacitor voltage exceeds a first threshold value, means coupled to receive said first control signal for controlling the amount of light reaching said camera, a second threshold circuit means coupled to said capacitor for generating a second control signal when the capacitor voltage exceeds a second threshold value higher than said first threshold value, and means for applying said second control signal to said current source to increase the amount of current applied to said capacitor.

2. A circuit as claimed in claim 1 wherein said applying means comprises a second capacitor, a second current source coupled to said second capacitor and unidirectional conducting means for coupling said second capacitor and second current source to receive said measuring signal, wherein the quotient of said second capacitance to the current nominally supplied to said second source is greater than the quotient of said first capacitance to the current nominally supplied by said first source.

3. A circuit as claimed in claim 2 further comprising means for preventing the operation of said controlling means when said measuring signal is below a selected value.

4. A circuit as claimed in claim 1 further comprising means coupled to receive said second control signal for increasing the speed of operation of said controlling means.

5. A circuit as claimed in claim 1 wherein said threshold circuits each comprise an amplifier having an inherent threshold value.

6. A circuit as claimed in claim 1 wherein said light controlling means comprises a variable aperture, a motor coupled to control said aperture, a multivibrator, and a gate coupled between said multivibrator and said motor and to receive said second control signal.

7. A circuit as claimed in claim 6 further comprising means for applying said second control signal to control the frequency of said multivibrator.

8. A circuit as claimed in claim 6 further comprising means for establishing the value of the multivibrator output signal between selected values.

9. A circuit as claimed in claim 1 wherein said camera output signal comprises three color component signal and said measuring signal generating means operates in accordance with the highest of said component signals.